United States Patent [19]

McLaughlin

[11] 4,391,526
[45] Jul. 5, 1983

[54] INTERFEROMETRIC SURFACE CONTOUR MEASURING ARRANGEMENT

[75] Inventor: Joseph L. McLaughlin, Marblehead, Mass.

[73] Assignee: Itek Corporation, Lexington, Mass.

[21] Appl. No.: 295,426

[22] Filed: Aug. 24, 1981

[51] Int. Cl.³ .............................................. G01B 11/24
[52] U.S. Cl. ..................................... 356/359; 356/237
[58] Field of Search ............... 356/347, 348, 359, 360, 356/237, 37

[56] References Cited
U.S. PATENT DOCUMENTS

| 3,680,966 | 8/1972 | Cofek et al. | |
| 3,761,186 | 11/1973 | Wason | |
| 3,907,438 | 9/1975 | Holeman | 356/360 X |
| 4,022,532 | 5/1977 | Montagnino | |
| 4,197,011 | 4/1980 | Hudson | 356/237 X |

FOREIGN PATENT DOCUMENTS 144999 4/1962 U.S.S.R. ............................... 356/360

OTHER PUBLICATIONS

Zielinski, "Unequal Path Interferometer Alignment and Use", *Optical Engineering*, vol. 18, No. 5, pp. 429–482, 10/79.

Hayes et al., "Testing of Nonlinear Diamond–Turned Reflaticons", *Applied Optics*, vol. 20, No. 2, pp. 235–239, 1/81.

*Primary Examiner*—Edward S. Bauer
*Assistant Examiner*—Matthew W. Koren
*Attorney, Agent, or Firm*—Homer O. Blair; Robert L. Nathans; Gerald H. Glanzman

[57] ABSTRACT

An arrangement for interferometrically recording in a single interferogram a full development of the contour of a symmetrical reflective surface, such as an internal or external cylindrical or conical surface. An optical system projects a light wave onto the reflective surface such that a reflected wave is formed. The reflected wave is interfered with a reference light wave to generate an interference pattern, and only a selected portion of the interference pattern is projected onto a film medium for recording. The reflective surface is scanned with the projected wave by relatively moving the projected wave relative to the surface, and synchronously therewith, the projected interference pattern is moved relative to the recording medium in a manner such that the information recorded on the film medium is a full development of the contour of the reflective surface.

23 Claims, 7 Drawing Figures

INTERFEROMETRIC SURFACE CONTOUR MEASURING ARRANGEMENT

BACKGROUND OF THE INVENTION

1. Field of the Invention

The present invention relates generally to an interferometric arrangement for measuring the contour of a reflective surface, and more particularly pertains to an arrangement of the aforementioned type for providing a recording which is a full development of the contour of a surface which may be an internal or external, linear or non-linear surface such as a cylindrical or conical surface.

2. Discussion of the Prior Art

The prior art has recognized for years the problems of providing interferometric data on the contour of a cylindrical or conical reflective surface, but heretofore has not provided an arrangement which is capable of making such measurements.

Montagnino U.S. Pat. No. 4,022,532 discloses an interferometer arrangement for measuring the contour of an optical surface in which a laser unequal path interferometer has a measuring beam and a reference beam. Reflective spots are mounted at a number of sample points on the surface, and the measuring beam is focused by an optical system to provide an image field that includes the reflective spots, which are oriented to reflect light from the measuring beam back to the optical system to form a conjugate image of the field of spots on photodetectors. The reference beam, the path length of which is modulated, is combined with the light reflected from the spots to the photodetectors. Separate detectors measure the intensity of the combination of the reference beam light and measuring beam light reflected from at least two different spots at one time. A shift in the position of one sample point forward or back in relation to another sample point, which is a reference point, is thus monitored by comparing the phase relationship of the combination of the reference light with reflected light derived simultaneously from at least a pair of the sample points.

Although the arrangement disclosed by this patent utilizes a laser unequal path interferometer, the actual measuring arrangement is quite different from the present invention, and does not provide an interferometric recording which is a full development of the contour of a reflective surface.

SUMMARY OF THE INVENTION

Accordingly, it is a primary object of the present invention to provide an arrangement for interferometrically recording a full development of the contour of a reflective surface.

A further object of the subject invention is the provision of an arrangement of the aforementioned type which permits the entire contour of a single rotationally symmetrical reflective surface, such as an internal or external cylindrical or conical surface, to be characterized by the recording of a single interferogram. In order to accomplish this overall objective, only a small, selected portion of the generated interferogram is recorded to provide a measurement of the surface contour.

In accordance with the teachings herein, the present invention provides an arrangement, in the form of a method and system, in which an optical system projects a light wave onto a reflective surface. The reflected wave is returned directly or via ancillary optics to be interfered with a reference plane wave to generate a resultant interference pattern, and only a selected portion of the interference pattern is projected onto a film medium for recording. The reflective surface is scanned with the projected wave by relatively moving the projected wave relative to the surface, and synchronously therewith the projected interference pattern is moved relative to the recording medium in a manner such that the information recorded on the film medium is a full development of the contour of the reflective surface.

In greater detail, in one embodiment wherein an interior cylindrical surface is symmetrical about a longitudinal axis of symmetry, the scanning optical system includes a mirror mounted within the cylindrical surface for producing relative scanning rotational movement between the cylindrical surface and the mirror. In this embodiment, the optical system focuses the plane light wave substantially at the longitudinal axis of symmetry of the cylinder which results in substantially all of the radiation being incident on the surface at orthogonal angles in a very efficient optical arrangement. In greater detail, the optical system also includes an anamorphic lens for focusing the plane light wave to a line image substantially coincident with the cylindrical axis in a first direction along a first axis while producing a collimated beam of light in a second direction along a second axis.

In an additional embodiment disclosed herein wherein an exterior conical surface is symmetrical about a longitudinal axis of symmetry, the scanning system includes a stationary optical system and the conical surface is mounted on a rotary table for scanning thereof. The recording medium includes a film recording disc which is mounted for synchronous rotation with the rotary table.

In accordance with the teachings herein, only a selected portion of the interference pattern is recorded by spatially filtering the projected interference pattern through a spatial filter in the form of a narrow slit.

BRIEF DESCRIPTION OF THE DRAWINGS

The foregoing objects and advantages of the present invention for an interferometric surface contour measuring arrangement may be more readily understood by one skilled in the art with reference being made to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
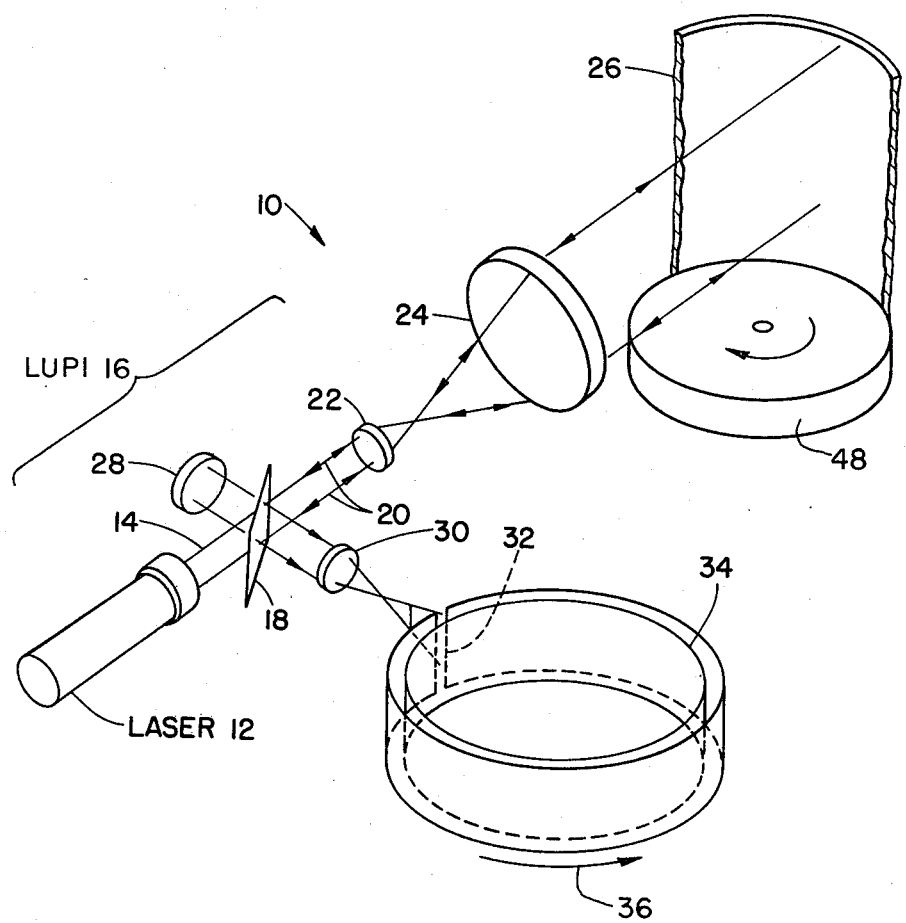
FIG. 1 is a schematic arrangement of an exemplary embodiment of a system for measuring and recording interferometric data relating to the contour of an interior cylindrical reflective surface constructed pursuant to the teachings of the present invention.

Referring to the drawings in detail, FIG. 1 illustrates a schematic arrangement of one exemplary embodiment 10 of the present invention illustrating the general principle of operation thereof. A laser source 12 generates a coherent, collimated radiation beam 14 in a Laser Unequal Path Interferometer (LUPI) 16. A beam splitter 18 therein transmits a first portion 20 of the laser beam such that it is incident upon a lens 22 which expands the beam and directs it to a collimating lens 24. The resultant expanded and collimated beam is then directed onto the surface of interest, which in this embodiment of the invention is an element 26 for an x-ray telescope which has a substantially cylindrical internal reflective surface.

The collimated beam is directed to be incident upon the cylindrical reflective surface at angles substantially perpendicular thereto. Those portions of the beam which are incident nearly normal to the surface are reflected therefrom and return through the interferometer to be interfered with a reference wavefront. In that regard, a portion of the laser beam incident on beam splitter 18 is reflected thereby onto a stationary reference mirror 28 and then back onto beam splitter 18 where it interferes with the returning beam from the reflective surface being examined to form an interference pattern.

The interference pattern is focused by a projecting lens 30 through a spatial filter 32, in the form of a narrow slit, onto a recording film medium 34. The spatial filter 32 and recording medium 34 are mounted substantially at the focal plane of projecting lens 30. The recording medium is mounted on a rotationally movable film drum 36 which is rotated in synchronization with rotation of the reflective surface during scanning thereof, in a manner as will be described in further detail below.

Figure 2:
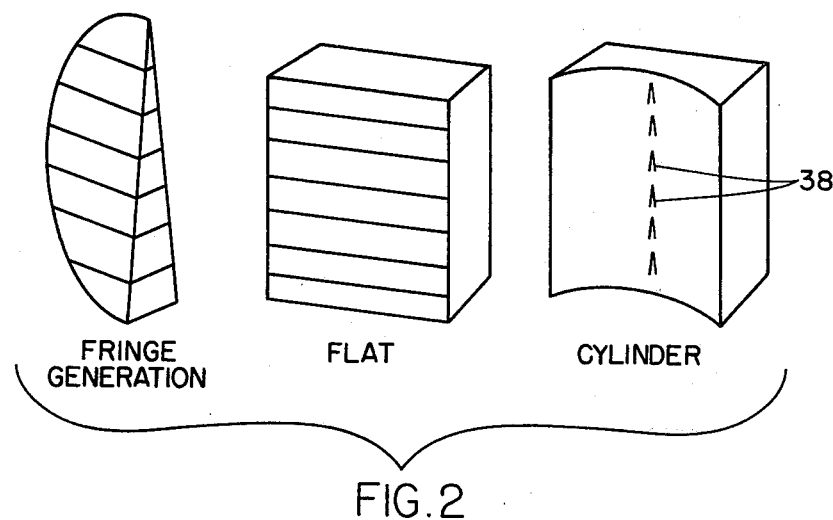
FIG. 2 is an illustration of principles of fringe generation in interferometry.

It may be instructional at this time to recall that the fringes generated in a LUPI are fringes formed by constructive and destructive interference between a test wavefront and a reference wavefront tilted with respect to the test wavefront. When the optical path difference between these two wavefronts changes by one wavelength ($\lambda$), then a new fringe is formed, as illustrated generally by the left portion of FIG. 2. If both the reference wavefront and the test wavefront are flat, then the fringes form a series of parallel, straight lines, as illustrated by the central portion of FIG. 2. If the test wavefront is substantially cylindrical, as in the first disclosed embodiment, then each fringe is a cusp 38 in a series of cusps, as illustrated by the right portion of FIG. 2.

Accordingly, in the first embodiment illustrated herein, the portion of the wavefront which is incident nearly normal to the cylindrical surface returns through the interferometer and forms a set of fringes at the recording medium. These fringes are a series of steep, nested near parabolas with the apices of the fringes occurring at locations where the mirror surface is precisely orthogonal to the incident beam. The frequency of the fringe apices (number per inch) is determined by the axial slope difference between the wavefront from the cylindrical surface and the wavefront of the reference beam as in FIG. 2 (fringe generation).

The fringes are spatially filtered by narrow slit 32, and are imaged onto a recording film medium placed on a film drum. The film slit is sufficiently narrow to isolate the fringe apices, such that a purely axial section of the cylinder is recorded. In operation, the x-ray telescope cylinder 26 is rotated in azimuth on a precision rotary table 48, and the apex fringe position for each azimuth is continually recorded by scanning the image onto the rotating film strip 34 supported for rotation on the rotating cylindrical drum 36. In this manner, a continuous recording of the entire interior surface profile of the cylinder 26 is recorded on a continuous film strip 34. In this profile, each fringe corresponds to the locus of the points of constant separation between the axis of the rotary table and the surface of the cylinder.

The resultant film strip carries surface parameter information in the form of a continuous recorded interferogram for the entire circumference of the cylinder at a height approximately equal to the width of the collimated beam incident on the cylindrical surface. The recorded interferogram can be reduced or transformed to digital data by digitization in a high resolution digitizer. The resultant digital data can be processed using known least squares programming techniques to remove the reference wavefront tip and tilt as well as residual axial power (interferometer focus). A Fourier expansion of the data can also be implemented to determine the cylinder's tip and decenter.

Figure 3:
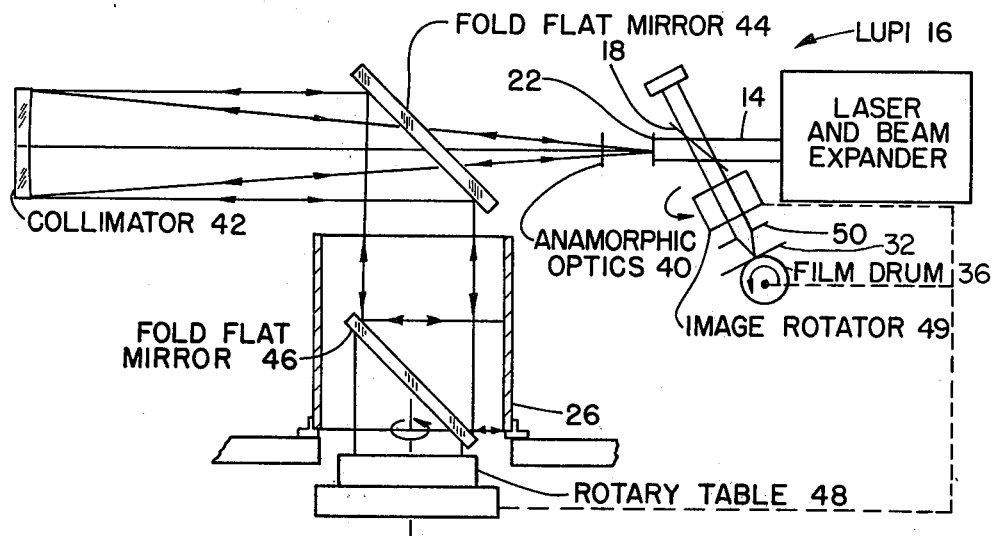
FIG. 3 illustrates a partially sectional, elevational view of a more detailed embodiment of an interferometric measuring system for an interior cylindrical surface.

FIG. 3 illustrates a partially sectional, elevational view of one particular optical system which can be employed in accordance with the teachings of the present invention. An expanded laser beam 14 is introduced by way of a LUPI 16, and the portion of the laser beam which passes through beam splitter 18 is directed through a spherical diverging lens system 22 to an anamorphic optical system 40. The anamorphic optical system may be a cylindrical lens which collimates the beam along one axis and does not affect the beam along a second axis, as will be explained in greater detail with reference to FIGS. 4 and 5. The wavefront incident on the anamorphic optical system from the diverging lens is a spherical wavefront. Optical system 40 has no power in the vertical direction and accordingly allows the beam to continue diverging in an unaffected manner in that direction, but produces a substantially collimated beam in the horizontal direction.

As illustrated in FIG. 3, the beam is reflected by a collimating reflector 42 to sequentially-placed flat fold mirrors 44 and 46 which are positioned to reflect the beam onto the interior cylindrical surface 26 at substantially orthogonal directions. In the embodiment of FIG. 3, the fold mirror 46 is positioned inside cylindrical surface 26 on a rotary table 48 to cause the incident beam to scan the surface as a continuous series of axial or longitudinal line scans. In an alternative embodiment the fold mirror 46 might be stationarily mounted, while the cylindrical surface 26 is mounted for rotational movement, as shown schematically in FIG. 1 and also by embodiment of FIGS. 4 and 5.

The reflected test wavefront is then reflected back by fold mirror 46, fold mirror 44, parabolic reflector 42, and through the anamorphic and diverging optical systems 40 and 22 to LUPI 16. The resultant interference pattern is projected through an image rotator 49, through a further focusing optical system 50 and then through the spatial slit filter 32 to a film recording medium 34 mounted on a cylindrical drum which rotates in synchronism with rotary table 48. The spatial slit filter 32 and recording film are positioned substantially at the image plane of optical system 50, and the spatial slit filter functions to allow only the apices to be passed through to be recorded on the film. The image rotator 49, which is known per se in the optical arts and can be simply a rotating prism, is rotated in synchronism with the rotary table 48 and film drum, as indicated by the dashed mechanical connections in FIG. 3, such that the image is properly oriented to be colinear with the slit spatial filter for recording on the film strip. This embodiment of the present invention requires an image rotator 49 because the fold flat mirror 46 is rotated relative to the substantially cylindrical surface 26 (rather than vice versa as in the previous embodiment), and accordingly the image into the rotator is also rotated and the image rotator 49 in effect derotates the image.

Figure 4:
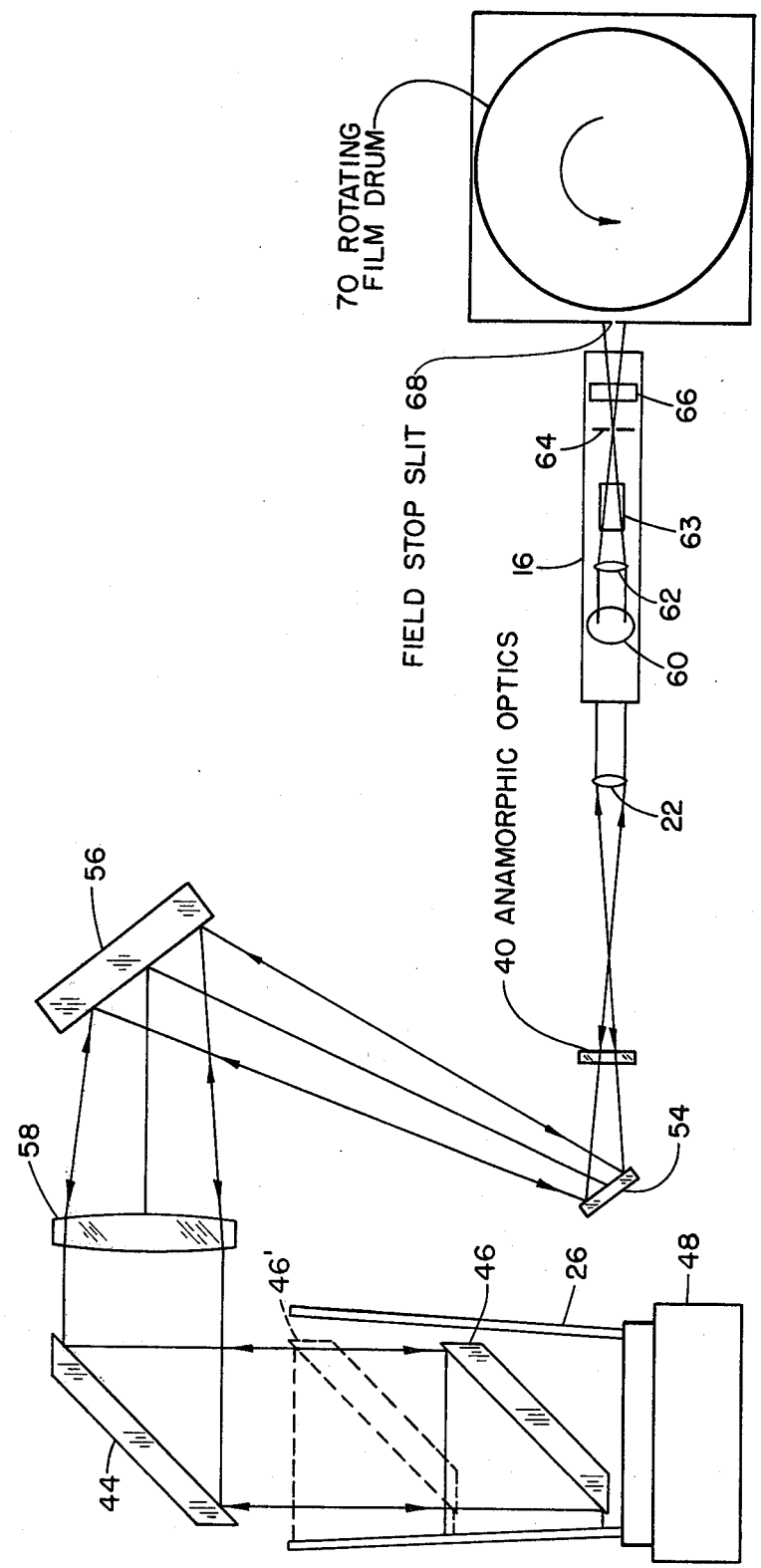
FIGS. 4 and 5 are respectively elevational and plan views of optical diagrams illustrating further details of the optics of one exemplary embodiment of the present invention for recording interferometric data relating to the contour of an interior cylindrical surface.
Figure 5:
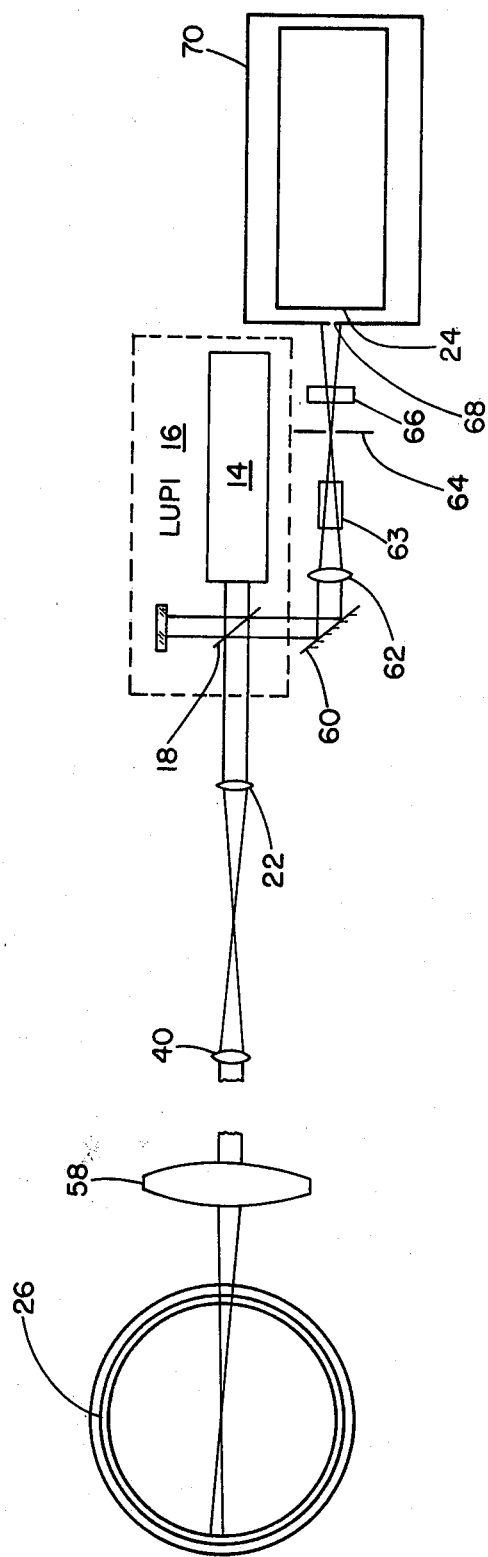

FIGS. 4 and 5 are respectively elevational and plan views of optical diagrams illustrating further details of the optics of a further exemplary embodiment, and particularly shows the function of the anamorphic optical system 40. Referring first to FIG. 5, the output of a laser 14 is expanded, and the collimated, coherent beam is directed through beam splitter 18 to a spherical beam diverger lens 22. The lens 22 produces a spherically expanding wavefront which is incident on anamorphic optical system 40, which may be simply a cylindrical lens. The anamorphic optical system has no power in the vertical direction, and accordingly allows the beam to continue diverging in that direction as shown clearly in FIG. 4. However, it is designed to collimate the beam in a horizontal direction as illustrated clearly in FIG. 5. Flat fold mirrors 54 and 56 are present in this embodiment to redirect the beam vertically onto a collimating lens 58 which collimates the diverging beam in a vertical direction, as shown in FIG. 4, and focuses the collimated beam in a horizontal direction, as illustrated in FIG. 5. The beam is focused in the latter direction at the longitudinal axis of symmetry of the cylindrical component 26 being tested. This arrangement results in the beam diverging in this direction from the longitudinal axis, such that a maximum amount of the beam is incident upon the cylindrical surface in directions substantially perpendicular thereto. In the vertical direction, the collimated beam is redirected by flat fold mirrors 44 and 46 such that it is incident upon the cylindrical surface at substantially orthogonal angles in this direction also.

In this embodiment, the fold mirror 46 is stationarily mounted, and the cylindrical surface is mounted on a precision rotary table 48 for scanning thereof. The reflected beam is then redirected back by reflective mirror 46 reflective mirror 44, lens 58, reflective mirror 56, reflective mirror 54, lens 40 and lens 22 to the LUPI 16.

The resultant interference pattern formed in LUPI 16 is projected onto a flat fold mirror 60, to an image projecting lens 62, through an image rotating element 63, which may be simply a rotatably mounted prism, through a spatial filter 64, through a prism polarizer 66, through an adjustable field stop slit 68 onto a recording film strip 24 mounted on a rotating film recording drum 70. In this embodiment, the additional spatial filter 64 assists in further defining the image, and the polarizer 66 provides polarized filtering of the image. Components 62, 63, 64 and 66 function to modify the fringe contrast and orientation and the image position to form a high contrast image at the adjustable field stop slit 68. The field stop slit 68 spatially filters the image field such that only the apices of the fringes are passed therethrough to be recorded on the film strip. In this embodiment the image rotator 63 is provided to precisely align the image with the spatial filters, and does not rotate during scanning of the cylindrical component 26.

In the embodiment of FIGS. 4 and 5, the height of cylindrical surface 26 and the height of the collimated beam incident thereon is such that the entire vertical surface of the cylinder cannot be scanned in one operation. Accordingly, fold mirror 46 is vertically positionable in cylinder 26, as indicated by the second position in dashed lines designated by 46', such that two or more overlapping scans can be taken to enable the entire surface to be scanned. Suitable fiducial marking can be utilized in recording the overlapping interferograms to enable the different scan sections to be matched to produce one contour map of the entire cylindrical surface.

In summary, the width of the adjustable field stop slit 68 is maintained sufficiently narrow to isolate the fringe apices such that a purely axial section of the cylinder is observed at an azimuth position determined by the position of the fold mirror/rotary table. As the rotary table is driven in azimuth, and the film drum is synchronously rotated therewith, the instantaneous axial section scans over the entire 360° interior circumference of the cylinder and is projected onto the entire exterior circumference of the film drum in a mapping which is a one-to-one scale in azimuthal angle. Each fringe apex traces a line along the film drum corresponding to the locus of points of constant separation between the axis of the rotary table and the surface of the cylinder. A deviation from a straight line of the apices of the parabolic fringes at a particular azimuthal location would indicate an irregularity in axial slope, and accordingly the arrangement is exceptionally sensitive to axial figure deviations.

The resultant film strip, unrolled from its drum, is a mathematical development of the interference pattern produced by the interior surface of the cylinder, and constitutes a fully self-consistent body of data for the full range of azimuths. Apart from small scale shifts due to sag, the two coordinates of the film strip correspond to axial lines along the surface ($\theta$ fixed, z varies) and circumferential developments (z fixed, $\theta$ varies). The entire film strip is therefore an interferogram of the optical surface of the cylinder obtained at normal incidence. This can be analyzed by known techniques used in standard surface interferometry such that axial figure, roundness, and local slope variations can be determined from the data.

The implementation of the teachings herein with the anamorphic optical system offers a number of advantages over other embodiments without this feature, including increased system energy throughput by compression of the beam along one axis, and also anamorphic magnification of the beam to broaden the apices of the fringes which are incident at spatial filter field stop 68.

Figure 6:
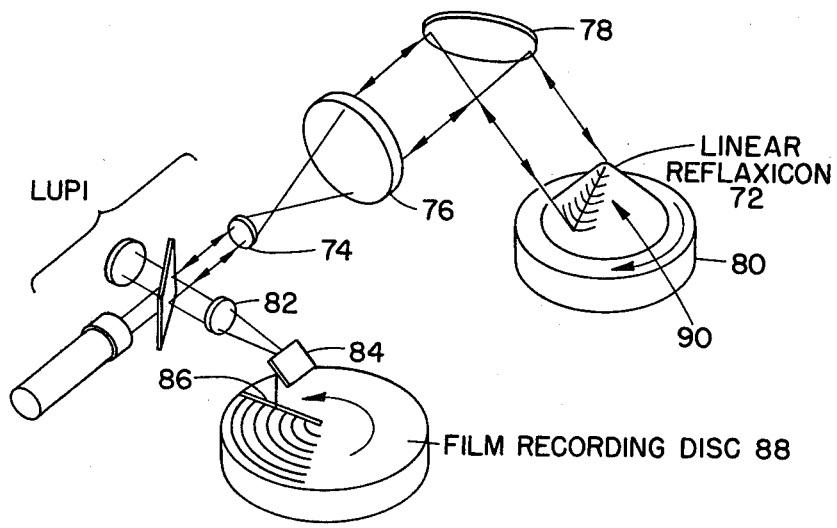
FIG. 6 is a schematic illustration of an embodiment for measuring and recording interferometric data relating to the contour of the surface of a reflaxicon element, which has an exterior substantially conical surface.

FIG. 6 is a schematic illustration of an embodiment for measuring and recording interferometric data pertaining to an exterior, substantially linear conical surface of a reflaxicon element 72. A collimated beam from a LUPI is incident upon a lens 74 which expands the beam and directs it to a collimating lens 76. The resultant expanded and collimated beam is then directed by mirror 78 substantially orthogonally onto the surface of interest, which in this embodiment is an external, substantially linear conical surface of a reflaxicon element 72 rotationally mounted for scanning on a rotary table 80. A lens 82 projects the output of the LUPI against a fold mirror 84, and focuses it through a spatial slit filter 86 onto a film recording disc 88 mounted for synchronous rotation with the rotary table 80. The spatial slit filter 86 functions as in the previous embodiments to isolate for recording only the fringe apices such that a purely axial section of the conical surface is observed and recorded.

This embodiment of the present invention forms a set of fringes at the recording disc which are a series of nested near parabolas, with the apices of the fringes occurring at locations where the mirror surface is precisely orthogonal to the incident beam. FIG. 6 illustrates the origins 90 of the series of near parabolas on the linear conical surface of the reflaxicon element 72.

Figure 7:
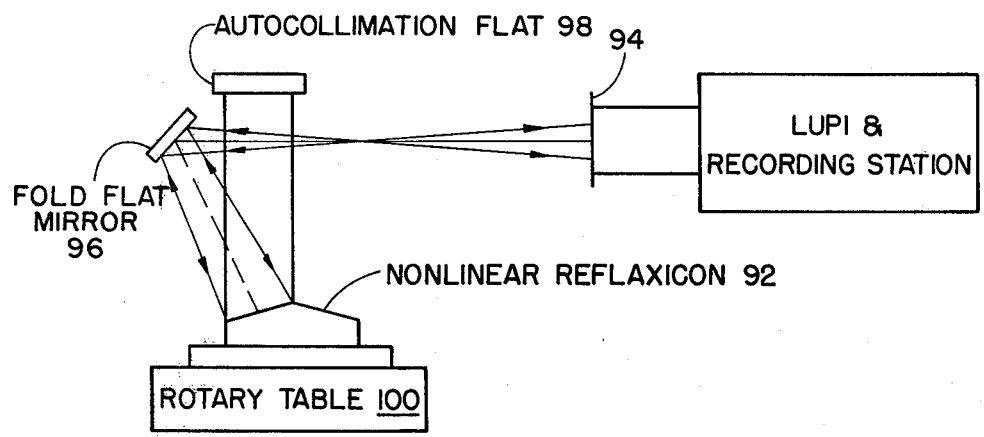
FIG. 7 is an elevational view of a further embodiment of the present invention for interferometricly measuring the contour of a nonlinear exterior surface of a reflaxicon element.

FIG. 7 is an elevational view of a further embodiment for interferometrically measuring the contour of an external, nonlinear, substantially conical surface of a reflaxicon element 92. The output of a LUPI is expanded by a lens 94, and directed via a flat fold mirror 96 against the nonlinear exterior surface of the reflaxicon element 92. In this embodiment the lens 94 forms an image at the focal point of a radial segment of the nonlinear surface of the reflaxicon element, and this results in the reflected wave from the nonlinear surface being substantially collimated. The collimated reflected beam is incident upon an orthogonally positioned autocollimation flat mirror 98 which redirects it back against the surface of the reflaxicon, to fold flat mirror 96, through lens 94 and back into the LUPI and recording station, the details of which are not repeated again in this embodiment. As in previously explained embodiments, the element 92 being measured is mounted on a rotary table 100 to enable the entire surface of the element to be sequentially scanned. In this embodiment, the wavefront is reflected twice from the surface under investigation which results in the recorded interferometric data having twice the sensitivity to surface deviations.

While several embodiments and variations have been described in detail herein, it should be apparent that the teachings and disclosure of the present invention will suggest many other embodiments and variations to those skilled in this art. For instance, although the present invention has been described in context with cylindrical, conical and reflaxicon surfaces, other types of symmetrical shapes such as axicon or waxicon surfaces might also be scanned or mapped within the teachings of the present invention. Also, alternative types of recording mediums, other than a film strip, might be utilized in context with the present invention.

What is claimed is:

1. A method of interferometrically measuring the contour of a reflective surface, comprising the steps of:
   a. projecting a light wave onto the reflective surface such that a wave is reflected therefrom;
   b. interfering the reflected wave with a reference wave to form a resultant interference pattern;
   c. projecting a portion of the resultant interference pattern onto a recording medium;
   d. scanning the reflective surface with the projected wave by relatively moving the projected wave relative to the reflective surface; and
   e. moving the projected interference pattern relative to the recording medium synchronously with the scanning of the reflective surface, whereby the information recorded on the recording medium is a development of the contour of the reflective surface.

2. A method of interferometrically measuring the contour of a reflective surface as claimed in claim 1, wherein the reflective surface is substantially symmetrical about an axis of symmetry, and said step of scanning includes the step of scanning the reflective surface about said axis of symmetry.

3. A method of interferometrically measuring the contour of a reflective surface as claimed in claim 2, wherein the reflective surface is an exterior surface which is symmetrical about a longitudinal axis and said step of scanning includes the step of rotating the exterior surface about said longitudinal axis.

4. A method of interferometrically measuring the contour of a reflective surface as claimed in claim 2, wherein the reflective surface is an interior surface which is symmetrical about a longitudinal axis, and said step of scanning includes the step of mounting a mirror within the interior surface for relative rotational movement between the interior surface and the mirror.

5. A method of interferometrically measuring the contour of a reflective surface as claimed in claim 4, wherein said step of scanning includes the step of rotating the interior surface relative to the mirror.

6. A method of interferometrically measuring the contour of a reflective surface as claimed in claim 4, wherein said step of scanning includes the step of rotating the mirror relative to the interior surface.

7. A method of interferometrically measuring the contour of a reflective surface as claimed in claim 4, wherein said step of projecting includes the step of focusing the one axis of the light wave substantially at said longitudinal axis.

8. A method of interferometrically measuring the contour of the reflective surface as claimed in claim 7, wherein said step of projecting includes the step of anamorphically focusing the light wave to a line image substantially coincident with said cylindrical axis.

9. A method of interferometrically measuring the contour of a reflective surface as claimed in claim 1, wherein said step of projecting a portion includes the step of projecting a portion of the interference pattern through a spatial filter.

10. A method of interferometrically measuring the contour of a reflective surface as claimed in claim 9, wherein said spatial filter is a narrow slit.

11. A method of interferometrically measuring the contour of a reflective surface as claimed in claim 1, wherein said steps of projecting a light wave and interfering are performed with a laser unequal path interferometer.

12. A method of interferometrically measuring the contour of a reflective surface as claimed in claim 1, wherein said step of projecting a light wave includes the step of first expanding the projected beam and then collimating the expanded beam along at least one axis.

13. A method of interferometrically measuring the contour of a reflective surface as claimed in claim 1, wherein said step of projecting a light wave includes the step of anamorphically projecting the light beam such as that it is collimated along one axis and converges along a second axis to an axis of symmetry for the reflective surface.

14. A system for interferometrically measuring the contour of a reflective surface, comprising:
a. optical means for projecting a light wave onto the reflective surface such that a wave is reflected therefrom, and for interfering the reflected wave with a reference light wave to form a resultant interference pattern;
b. means for projecting a portion of the resultant interference pattern onto a recording medium;
c. means for scanning the reflective surface with the projected wave by relatively moving the projected wave relative to the reflective surface; and
d. means for moving the projected interference pattern relative to the recording medium synchronously with the scanning of the reflective surface, whereby the information recorded on the recording medium is a development of the contour of the reflective surface.

15. A system for interferometrically measuring the contour of a reflective surface as claimed in claim 14, wherein the reflective surface is substantially symmetrical about an axis of symmetry, and said scanning means includes a beam deflector rotationally mounted about said axis of symmetry.

16. A system for interferometrically measuring the contour of a reflective surface as claimed in claim 15, wherein the reflective surface is an interior surface which is symmetrical about a longitudinal axis, and said beam deflector includes a mirror mounted within the reflective surface for relative rotational movement between the reflective surface and the mirror.

17. A system for interferometrically measuring the contour of a reflective surface as claimed in claim 16, wherein said optical projecting means includes means for focusing the light wave substantially at said longitudinal axis.

18. A system for interferometrically measuring the contour of a reflective surface as claimed in claim 17, wherein said focusing means includes means for anamorphically focusing the light wave to a line image substantially coincident with said longitudinal axis.

19. A system for interferometrically measuring the contour of a reflective surface as claimed in claim 14, wherein said means for projecting a portion includes means for projecting a portion of the interference pattern through a spatial filter.

20. A system for interferometrically measuring the contour of a reflective surface as claimed in claim 19, wherein said spatial filter is a narrow slit.

21. A system for interferometrically measuring the contour of a reflective surface as claimed in claim 14, wherein said optical projecting means includes a laser unequal path interferometer.

22. A system for interferometrically measuring the contour of a reflective surface as claimed in claim 14, wherein said optical projecting means includes means for expanding the projected beam and means for collimating the expanded beam along at least one axis.

23. A system for interferometrically measuring the contour of a reflective surface as claimed in claim 15, wherein said optical projecting means includes means for anamorphically projecting the light beam such that it is collimated along one axis and converges along a second axis to said axis of symmetry for the reflective surface.

* * * * *